(12) United States Patent
Paratore et al.

(10) Patent No.: US 6,234,393 B1
(45) Date of Patent: May 22, 2001

(54) FINGER POINT BAR CODE INPUT DEVICE

(75) Inventors: Robert M. Paratore, Woodinville; Thomas Richard Benson, Seattle, both of WA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/239,265

(22) Filed: Jan. 29, 1999

(51) Int. Cl.[7] ........................................ G06K 7/10
(52) U.S. Cl. ................ 235/462.46; 235/462.44; 235/462.2; 235/462.45; 235/462.24; 235/472.01; 235/472.02; 235/462.48
(58) Field of Search .................. 235/472.01, 472.02, 235/472.03, 462.48, 462.2, 462.24; 307/139; 273/183; 84/600; 200/52

(56) References Cited

U.S. PATENT DOCUMENTS

| | | | |
|---|---|---|---|
| 4,488,726 | * 12/1984 | Murray | 273/183 |
| 4,766,299 | 8/1988 | Tierney et al. | 235/472 |
| 5,212,372 | * 5/1993 | Quick et al. | 235/472 |
| 5,319,185 | * 6/1994 | Obata | 235/472 |
| 5,340,972 | 8/1994 | Sandor | 235/472 |
| 5,514,861 | 5/1996 | Swartz et al. | 235/472 |
| 5,756,982 | * 5/1998 | Knowles et al. | 235/472 |
| 5,837,990 | * 11/1998 | Shepard | 235/472 |
| 5,856,660 | * 1/1999 | Brad et al. | 235/462 |
| 5,907,147 | * 5/1999 | La | 235/472 |
| 6,003,774 | * 12/1999 | Bard et al. | 235/462.45 |

\* cited by examiner

*Primary Examiner*—Karl D. Frech
*Assistant Examiner*—U Chan Le
(74) *Attorney, Agent, or Firm*—O'Melveny & Myers LLP

(57) ABSTRACT

A device for scanning a bar code symbol is adapted on a glove to be worn comfortably on an operator's bare or gloved hand. The glove includes a scan element on the back of the glove electrically connected to an activation switch disposed on a bottom finger tip of the glove. The activation switch triggers the scan element to scan a bar code by pressing the finger tip at a base of the bar code symbol to be read. Sliding the finger to turn on the scan element is a natural motion and does not interfere with normal use of the hand.

26 Claims, 2 Drawing Sheets

FINGER POINT BAR CODE INPUT DEVICE

BACKGROUND OF THE INVENTION

1. Field of the Invention

The present invention relates to a bar code input device typically having an optical scan element that can be worn on the back of the hand allowing the user to scan a bar code symbol by simply pressing a finger at the base of the bar code symbol.

2. Description of Related Art

Optical readers and optical scanning devices have been developed for reading bar code symbols. A bar code symbol represents a common one-dimensional form of symbology, and comprises a pattern of vertical bars of various widths separated by spaces of various widths. Since the bar and space elements have different light reflecting characteristics, a reader can convert the symbology into an electrical signal by analyzing the light reflected from the symbol. The electrical signal can then be decoded to provide an alphanumeric representation of the symbol that identifies the object. Bar code symbols of this nature are now in common usage in various applications, such as inventory control, point of sale identification, or logistical tracking systems.

Many applications of the bar code readers require the operator to move about the readers and carry them from place to place. Thus, the readers must be easy to carry and operate. Hand-held devices have been developed to allow a user to aim the reader at a target bar code to be read. A problem with this type of reader is that the user is frequently a worker that is periodically entering data on a keyboard or performing several manual tasks with his hands related to the general work being undertaken. Traditional hand-held bar code readers have required intermittently setting down the device to perform other manual tasks, or switching to the other hand to facilitate the use of the hand for other operations.

As a result, several bar code readers have been adapted to be worn on the back of a user's hand. One type of hand-mounted device disclosed in U.S. Pat. No. 5,514,861 to Swartz, et al. is activated by pressing a button with the thumb. A drawback of the device is that the thumb must be bent in an awkward way to activate the button. Another hand-mounted device disclosed in U.S. Patent No. 5,340,972 to Sandor is activated by flexing the fingers. The operator activates the bar code scan element by raising, extending and pointing his finger at the bar code and keeping it flexed until the operator desires to deactivate the reader. This device is also undesirable because the bar code scan element is activated when both the index finger and the middle finger are in relaxed nonpointing positions followed by a pointing position of the index finger and the simultaneous relaxed nonpointing position of the middle finger. The user must consciously relax the fingers other than the index finger to activate the scan element. Another hand-mounted device disclosed in U.S. Pat. No. 4,766,299 to Tierney, et al. is activated by flexing the hand in a certain fashion to be detected by the device. The switch is activated by deliberate flexure of the muscles in the hand such as clenching the hand into a fist or pointing a finger in the direction of the bar code. Thus, these types of readers require unnatural movements of the hand to actuate the scan element.

Another significant drawback of conventional hand-mounted readers is that they have complex optical systems that add bulk and high scan element costs. The scan element may include a laser scanning device mounted in a housing such that a laser is aimed in the direction of the bar code. These laser scanning systems generally comprise complicated systems such as lenses and mirrors to read a bar code symbol, thus increasing the bulk and expense of such systems.

Conventional hand-mounted bar code readers have another drawback in that they generally include an integrated glove that incorporates a scan element in a housing that is often bulky and sits high on the hand or finger. Some users may be required to use additional gloves such as protective gloves for lifting inventory. Bulky conventional gloves incorporating the scan element can only be worn on a bare hand and would preclude the user from wearing any other type of glove.

Accordingly, a need exists for a low cost, low complexity hand-mounted bar code reader that allows a user to scan bar codes with a natural motion and to wear it on a bare or gloved hand.

SUMMARY OF THE INVENTION

In accordance with the teachings of this invention, a bar code input device incorporated on a glove is provided. The device is simple and easy to use on a bare hand or on top of another glove. The natural motion of sliding a switch or a depressed button disposed at the finger tip of the glove across the base of a bar code to activate a scan element effectively avoids interference with the normal use of the hand, which is a drawback of traditional hand-mounted bar code readers. The arrangement of the elements causes the scanning distance to be short allowing the use of pin hole optic techniques and making the scan element design of the present invention simple and inexpensive due to small deviation in read range relative to variable finger length differences.

According to an embodiment of the invention, the bar code input device is disposed on a glove worn on the back of a system operator's hand. The glove comprises a wrist strap and a finger hood to which a scan element and an activation switch are coupled. The activation switch energizes the scan element when the operator presses the finger tip against the surface on which a bar code symbol is located. Hard-wired connections are provided for the different signal communications between the scan element and the activation switch. The scan element provides inputs to a control unit located separately from the glove.

A more complete understanding of the finger point bar code input device will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

This invention provides a low cost, low complexity hand-mounted bar code input device that allows an operator to scan bar codes with a natural motion and to wear the device on a bare or gloved hand while avoiding the complexity and drawbacks of conventional hand-mounted bar code readers. In the detailed description that follows, like element numerals are used to describe like elements shown in one or more of the figures.

Figure 1:
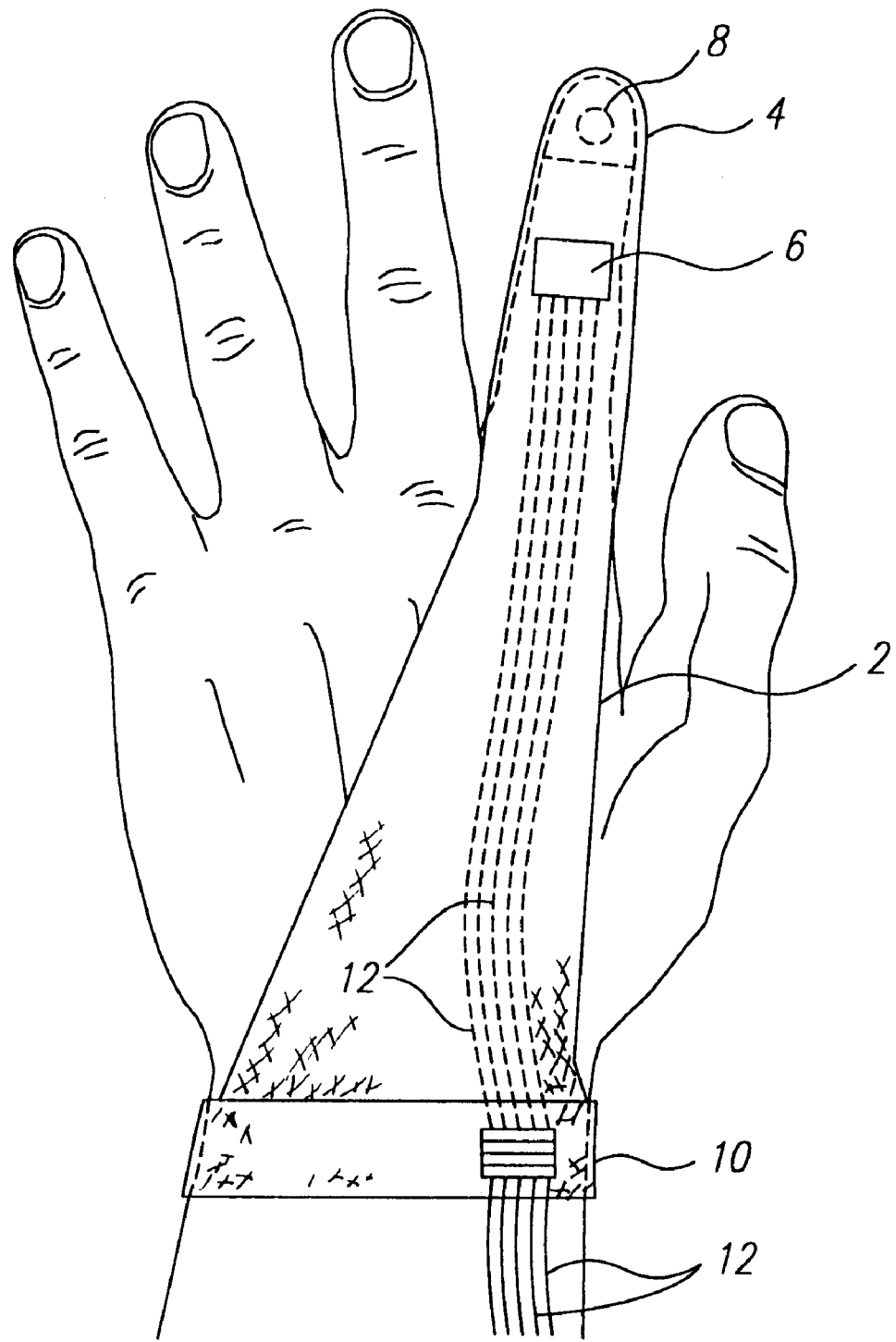
FIG. 1 is a plan view of a finger point input device disposed on the back of an operator's hand in accordance with an embodiment of the present invention.

Referring first to FIG. 1, a glove 2 incorporating a bar code input device is illustrated. The glove 2 is worn on the back of the hand, and is secured by a wrist strap 10 and a finger hood 4 at the end of the index finger. The finger hood 4 may also be worn on any one of the other fingers. At the bottom side of the finger, the finger hood 4 may be long enough to cover the index finger entirely or only a portion of it. As shown in FIG. 1, the glove 2 covers only a portion of the back of the operator's hand. The glove 2 does not cover the bottom of the hand except for the finger hood and the wrist strap. It should be appreciated, however, that the glove can also be made to entirely cover any or all portions of the operator's hand.

It is anticipated that the glove 2 will be flexible and comfortable enough to accommodate differences in the hand sizes of different operators. The glove is preferably made of durable, light, and flexible material so that the operator may wear it comfortably on a gloved or bare hand. The glove material is preferably made of nylon, but for certain applications, leather, cloth or a flexible plastic laminate would also be suitable materials. Also, the glove preferably includes layers into which connectors can be placed.

The wrist strap 10 must also be sufficiently flexible to accommodate differences in operator wrist sizes. Preferably, the wrist strap is made of a flexible material that is comfortable to wear and commonly available and widely used in skin contact applications. For example, it can be an elastic band, or it can be made of leather or a sponge-like material to provide comfortable padding lined with a durable fabric such as nylon, cloth, etc. The wrist strap can be fastened together by an attachment mechanism such as a hook and loop fastener like Velcro™, or some other type of fastening that is easily manipulated with one hand.

FIG. 1 shows that the glove further includes a scan element 6 and an activation switch 8. The scan element 6 is located on the glove on the back of the finger between the knuckle and an area close to the knuckle or the tip of the finger hood 4. The activation switch 8 may be disposed inside the finger hood 4 on the bottom side of the tip. The activation switch 8 may be a pressure switch or it may be of a push button type. Furthermore, the switch 8 may be of a type that is turned on for only as long as the switch is depressed or it may be of a type that is turned on continuously once the switch has been activated until such time as the system terminates the read request. This action may be a fixed-time event or terminated by a good bar code read.

Figure 2:
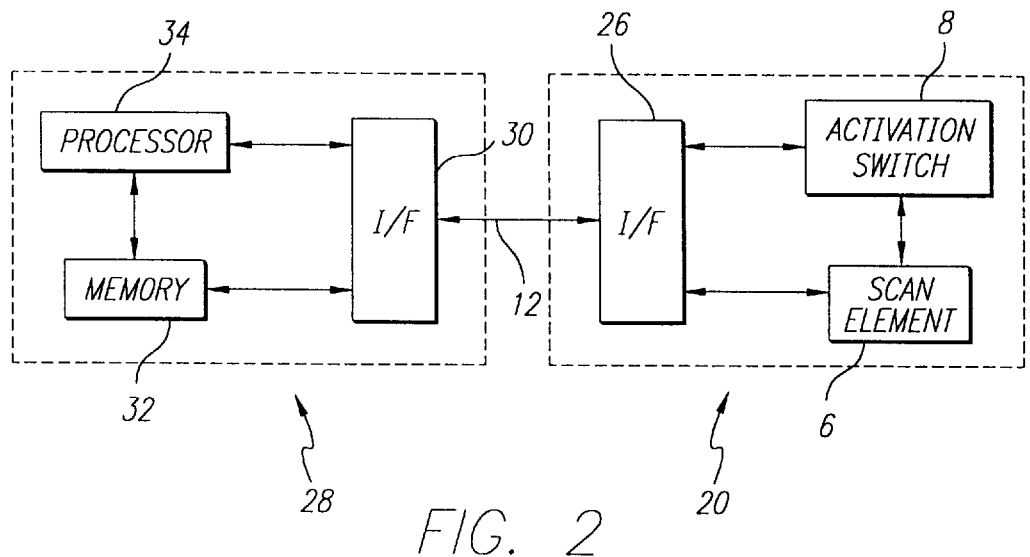
FIG. 2 is a simplified electrical block diagram of an embodiment of the present invention.

Wires 12 from the wrist strap 10 are coupled to the scan element 6 and the activation switch 8. Preferably, wires 12 are contained within the fabric of the glove 2. However, the wires can be attached to the outer or interior surface of the glove. The glove 2 and the wires 12 can be arranged so that the wires are bundled together, or are spread out over a large portion of the glove. The wires can also be arranged in a position other than the back of the operator's hand. Wires 12 also provide electrical connection to a control unit (described below) that is located separately from the glove 2. Referring now to FIG. 2, an electrical block diagram illustrating an embodiment of the invention is provided. The bar code input device 20 comprises a scan element 6 and an activation switch 8 connected to each other and to an interface 26. Interface 26 may be integrated with the scan element 6 or it may be separate. Interface 26 is then connected by wires 12 to an interface 30 of a control unit 28.

The control unit 28 comprises a processor 34 and a memory 32 connected to interface 30. Interfaces 26 and 30 receive and transfer data from the scan element 6 to the processor 34. The processor 34 receives raw image data from the scan element 6 actuated by the activation switch 8 and processes the data in accordance with software instructions to generate an output. The processor 34 performs various decoder functions. The processor 34 first determines the pulse widths and spacings of a signal received through interfaces 26 and 30. The processor 34 then analyzes the widths and spacings to find and decode a scanned bar code symbol, including recognition of characters and sequences, as defined by an appropriate code standard. The analysis may also include an initial recognition of the particular standard to which the scanned bar code symbol conforms. The processor 34 may be provided by a microprocessor, digital signal processor, or other digital or analog circuitry. The processor 34 is associated with memory 32, which may include a random access memory (RAM) for storing data, and read only memory (ROM) for storing fixed programming data, etc. As such, the control unit 28 may include elements similar to those found in a hand-held or laptop computer.

Cable connections are provided for the different signal communications between the activation switch 8, the scan element 6 and the processor 34. Alternatively, the control unit 28 may have an infrared light (IR) or radio frequency (RF) data link to communicate with the bar code input device 20. In certain applications the control unit 28 can be a small computer unit carried on the belt of the operator that in turn communicates with a nearby host computer.

Figure 3:
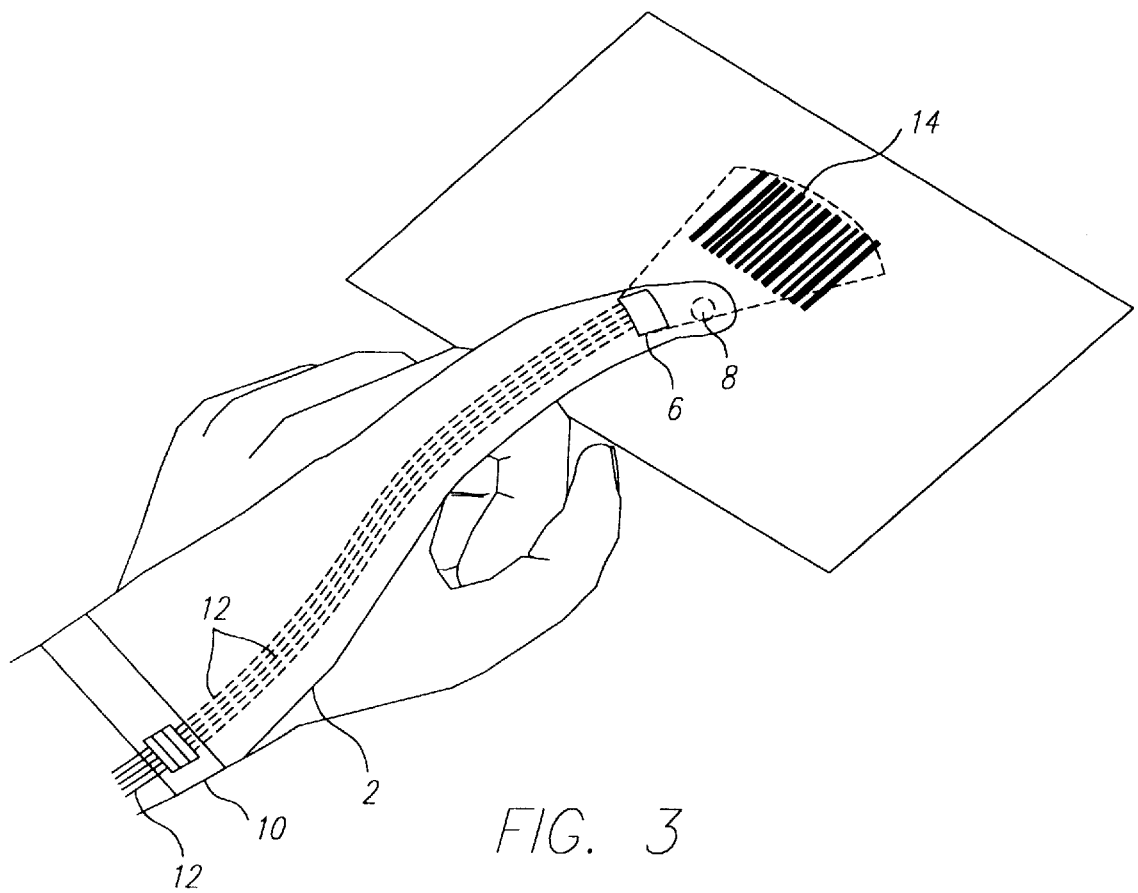
FIG. 3 is a perspective view of the operator's hand positioned to scan a bar code symbol using the finger point input device by pressing the end of the index finger against the bar code symbol.

Referring now to FIG. 3, the operating position of the bar code input device is illustrated. To scan a bar code symbol 14, the operator presses the index finger across the base of the bar code symbol to be read, thus activating the switch 8. This arrangement allows the scanning distance to be short depending only on the variation in the lengths of the fingers of the users. This makes the scan element design of the present invention simple and inexpensive, and allows the use of pin hole optic techniques, which include apertures that can be used without the need for additional focusing. The activation switch 8 can be of a type that energizes the scan element 6 for only as long as the operator slides the switch across the base of the bar code or it may be turned on continuously once the switch has been activated until such time as the system terminates a read request. This action may be a fixed-time event or terminated by a good bar code read. It should be appreciated that the actuation motion of pressing the end of the index finger against the base of the bar code accommodates easy operation by the user and is a natural motion that does not require awkward movements of the hand. Also, it is anticipated that the operator will not remove the glove to perform typical manual tasks such as operating machinery or lifting objects because the glove positions the bar code input device in a way that allows normal use of the operator's hand and arm. The glove is flexible and can be adapted for ambidextrous use allowing the operator to fit any finger on the right or left hand such that unique right and left handed versions are not required.

The actuation motion turns on the scan element 6, which is coupled to the glove so that it is properly aimed at the bar code symbol 14. Then, the scan element 6 scans the bar code symbol 14 by converting the reflected light from the bar code symbol to electrical signals, as known in the art. There are several known optical scan elements that can serve as the scan element 6. Optical scan elements convert the bar code symbol into pixel information that is deciphered into the alphanumeric information represented by the bar code symbol. It is anticipated that the optical scan element 6 be a charge coupled device (CCD) that converts optical information from the bar code symbol into an electrical signal representation of a bar code symbol. The scan element 6 may further include apertures or other optical elements (not shown) to alter the field of view and focusing characteristics of the CCD. Another typical optical scan element is a light beam from a laser source. The light beam is optically modified to form a beam spot directed at a bar code. An optical sensor detects light of variable intensity reflected from the bar code symbol and generates electrical signals corresponding to the reflected light. Once the bar code symbol 14 has been scanned, electrical signals are communicated to the control unit 28. The data may be required to be compressed, for example through software, to eliminate distortion because of the image of the bar code being taken by the scan element 6 at an angle (as shown in FIG. 3).

Overall, the scan element of the present invention, which may comprise either a CCD or a laser beam source, is simple and inexpensive because the pressing of the finger at the base of the bar code causes the scan distance to be short, subject only to variation in the lengths of the fingers of the operators.

Having thus described a preferred embodiment of a finger point bar code input device, it should be apparent to those skilled in the art that certain advantages of the within system have been achieved. It should also be appreciated that various modifications, adaptations, and alternative embodiments thereof may be made within the scope and spirit of the present invention. For example, bar code symbols having bars and spaces of various widths to be scanned have been illustrated, but it should be apparent that the inventive concepts described above would be equally applicable to other symbols such as graphic patterns, alphanumeric characters or any other type of information that may be scanned and detected from the reflected light as a representation of variations at different points of the information. The invention is further defined by the following claims.

What is claimed is:

1. A bar code input device, comprising:
 a glove adapted to be worn on a system operator's hand; and
 means, coupled to said glove, for scanning a bar code symbol disposed in proximity to said glove, said scanning means being energized by contact between a tip of the glove and a surface on which the bar code symbol is disposed, said scanning means being oriented in general alignment with said tip of said glove such that a finger disposed within said tip effectively points in a vicinity of said bar code symbol during a scanning operation.

2. The bar code input device according to claim 1, further comprising activation means disposed on said tip of said glove for energizing said scanning means.

3. The bar code input device according to claim 2, wherein said activation means further comprises a switch.

4. The bar code input device according to claim 2, wherein said activation means further comprises a push button.

5. The bar code input device according to claim 2, wherein said activation means is turned on continuously for a fixed time.

6. The bar code input device according to claim 2, wherein said activation means is turned on continuously until such time as a good bar code read occurs.

7. The bar code input device according to claim 1, wherein said scanning means further comprises a charge coupled device (CCD).

8. The bar code input device according to claim 1, wherein said scanning means further comprises a laser beam source.

9. The bar code input device according to claim 1, further comprising a control unit disposed separately from said glove.

10. The bar code input device according to claim 9, further comprising means for coupling said control unit to said scanning means.

11. The bar code input device according to claim 10, wherein said coupling means further comprises a hard-wired connection.

12. The bar code input device according to claim 10, wherein said coupling means utilizes a radio frequency medium.

13. The bar code input device according to claim 10, wherein said coupling means utilizes an infrared light transmitting medium.

14. A bar code input device, comprising:
 a glove adapted to be worn on a system operator's hand, said glove having a wrist strap and a finger hood, said finger hood further comprising a tip located at an end of a finger of said operator's hand;
 a scan element coupled to said glove on a back portion of said finger; and an activation switch electrically connected to said scan element, said activation switch being mounted at said tip of said finger hood, wherein said activation switch activates said scan element to scan a bar code symbol when the operator presses the finger tip against a surface on which said bar code symbol is disposed, said scan element being oriented in general alignment with said tip of said glove such that a finger of said operator's hand disposed within said tip effectively points in a vicinity of said bar code symbol during a scanning operation.

15. The bar code input device according to claim 14, wherein said scan element further comprises a laser beam source.

16. The bar code input device according the claim 14, wherein said scan element further comprises a charge coupled device (CCD).

17. The bar code input device according to claim 14, wherein said wrist strap further comprises a hook and loop fastener.

18. The bar code input device according to claim 14, wherein said wrist strap further comprises an elastic band.

19. The bar code input device according to claim 14, wherein said activation switch is turned on continuously for a fixed time.

20. The bar code input device according to claim 14, wherein said activation switch is turned on continuously once said activation switch has been activated unitl such time as a good bar code read occurs.

21. The bar code input device according to claim 14, further comprising a control unit disposed separately from said glove.

22. The bar code input device according to claim 21, further comprising means for coupling said control unit to said scan element and said activation switch.

23. The bar code input device according to claim 22, wherein said coupling means further comprises a hard-wired connection.

24. The bar code input device according to claim 22, wherein said coupling means utilizes a radio frequency transmitting medium.

25. The bar code input device according to claim 22, wherein said coupling means utilizes an infrared light transmitting medium.

26. The bar code input device according to claim 14, wherein the bar code input device is adapted for ambidextrous operation.

* * * * *